(12) United States Patent
Spiro et al.

(10) Patent No.: US 12,033,535 B2
(45) Date of Patent: Jul. 9, 2024

(54) SYSTEM AND METHOD FOR APPLYING AN IMAGE TO A SUBSTRATE TO FORM A DISPLAY ARTICLE

(71) Applicant: Tracer Imaging LLC, Ossining, NY (US)

(72) Inventors: Steven M. Spiro, Chappaqua, NY (US); Donald Lubarsky, New Windsor, NY (US); Ron Glaza, Worth, IL (US); Paul Dowd, Scarsdale, NY (US); Ryan Kelly, Astoria, NY (US)

(73) Assignee: Tracer Imaging LLC, Ossining, NY (US)

( * ) Notice: Subject to any disclaimer, the term of this patent is extended or adjusted under 35 U.S.C. 154(b) by 0 days.

(21) Appl. No.: 18/101,903

(22) Filed: Jan. 26, 2023

(65) Prior Publication Data
US 2023/0206789 A1 Jun. 29, 2023

Related U.S. Application Data

(62) Division of application No. 16/445,321, filed on Jun. 19, 2019, now Pat. No. 11,568,771.
(Continued)

(51) Int. Cl.
| | |
|---|---|
| *G09F 15/02* | (2006.01) |
| *A47G 1/17* | (2006.01) |
| *B32B 37/10* | (2006.01) |
| *B32B 37/12* | (2006.01) |
| *B32B 37/18* | (2006.01) |
| *B32B 38/00* | (2006.01) |
| *B32B 38/10* | (2006.01) |
| *B32B 38/18* | (2006.01) |

(Continued)

(52) U.S. Cl.
CPC ............ *G09F 15/02* (2013.01); *A47G 1/17* (2013.01); *B32B 37/12* (2013.01); *B32B 37/182* (2013.01); *B32B 38/10* (2013.01); *B32B 38/145* (2013.01); *B32B 38/1833* (2013.01); *B41M 5/502* (2013.01); *B65C 9/26* (2013.01); *B65C 9/36* (2013.01); *G09F 15/0018* (2013.01); *B32B 2037/109* (2013.01); *B32B 2311/30* (2013.01)

(58) Field of Classification Search
None
See application file for complete search history.

(56) References Cited

U.S. PATENT DOCUMENTS 2,776,149 A * 1/1957 Hobbs ................ B42D 5/005
281/44
5,766,398 A 6/1998 Cahill et al.
(Continued)

OTHER PUBLICATIONS

International Search Report and Written Opinion in PCT/US19/37868, dated Oct. 22, 2019 (13 pages).
(Continued)

*Primary Examiner* — Carson Gross
*Assistant Examiner* — Abhishek A Patwardhan
(74) *Attorney, Agent, or Firm* — Leason Ellis LLP

(57) ABSTRACT

A product for displaying an image or object (e.g., printed photo or a print, etc.) according to at least one implementation includes a first sheet having a front face and a rear face. An image or object is formed along the rear face. The product also includes an adhesive coated substrate, such as a ferrous metal substrate, to which the first sheet is adhesively affixed.

17 Claims, 14 Drawing Sheets

Related U.S. Application Data

(60) Provisional application No. 62/807,873, filed on Feb. 20, 2019, provisional application No. 62/721,010, filed on Aug. 22, 2018, provisional application No. 62/687,660, filed on Jun. 20, 2018.

(51) Int. Cl.
*B41M 5/50* (2006.01)
*B65C 9/26* (2006.01)
*B65C 9/36* (2006.01)
*G09F 15/00* (2006.01)

(56) References Cited

U.S. PATENT DOCUMENTS

| | | | |
|---|---|---|---|
| 6,054,006 A | 4/2000 | Pilon et al. | |
| 6,386,589 B1 * | 5/2002 | Yuh | B42F 9/001 281/21.1 |
| 6,482,288 B1 | 11/2002 | Kreckel et al. | |
| 6,971,616 B1 * | 12/2005 | Lake | B42F 9/001 24/67.3 |
| 8,819,974 B2 | 9/2014 | Noterman | |
| 8,959,817 B1 * | 2/2015 | Barnes | A47G 1/06 40/711 |
| 10,434,762 B2 | 10/2019 | Noterman | |
| 10,562,293 B1 | 2/2020 | Noterman | |
| 10,589,517 B2 | 3/2020 | Noterman | |
| 10,987,918 B2 | 4/2021 | Noterman | |
| 10,987,947 B2 | 4/2021 | Noterman | |
| 11,011,054 B2 | 5/2021 | Kim et al. | |
| 11,123,979 B2 | 9/2021 | Noterman | |
| 2004/0029030 A1 | 2/2004 | Murray | |

OTHER PUBLICATIONS

Non Final Office Action in U.S. Appl. No. 16/445,321, dated Jun. 9, 2022 (12 pages).

* cited by examiner

SYSTEM AND METHOD FOR APPLYING AN IMAGE TO A SUBSTRATE TO FORM A DISPLAY ARTICLE

CROSS REFERENCE TO RELATED APPLICATION

The present application is a divisional of U.S. patent application Ser. No. 16/445,321, filed Jun. 19, 2019, which claims priority and is related to U.S. patent application No. 62/687,660, filed Jun. 20, 2018; U.S. patent application No. 62/721,010, filed Aug. 22, 2018, and U.S. patent application No. 62/807,873, filed Feb. 20, 2019, each of which is hereby expressly incorporated by reference in its entirety.

TECHNICAL FIELD

The present invention is directed to printed products and in particular, relates to an improved system and method for printing or otherwise displaying an image, indicia, or object on a substrate, such as a ferrous metal substrate or other type of substrate, as well as mounting hardware.

BACKGROUND

Prints and photographs are used in a vast number of consumer products including framed wall displays and other products that are intended to be displayed, such as on a table or desk, etc. Prints and photographs can be formed on a number of different mediums including but not limited to different types of paper substrates, including photograph paper, etc.

One other type of medium on which a print can be formed is a metal substrate. As one can imagine, printing on a metal substrate (e.g., an aluminum sheet) raises certain challenges. One conventional technique comprises a roller printing process in which a metal substrate is fed into a special printer without bending the metal substrate. The metal substrate has previously undergone a process in which it is specially coated and the print dyes infuse directly into this specially coated aluminum sheet. This is a direct pass-thru process in which the metal sheet is fed through the roll-fed printer. One deficiency of this technique is that in the final product, the printed image is exposed (formed on the fascia) and can thus be scratched and it is easy to impart smudges on the printed front surface of the product. In addition, many printers do not have a direct sheet pass-thru option.

Another technique for transferring a print onto a metal substrate is a process in which the print is transferred onto the front surface of a plastic substrate (e.g., sheet) which includes an adhesive layer along its back surface. The plastic substrate is then mated to the metal substrate by bonding the adhesive back layer of the plastic sheet to a front surface of the metal substrate. As with the previously described technique, a main deficiency of this technique is that in the final product (display article), the printed image is exposed and thus can be scratched and it is easy to impart smudges on the printed front surface of the product. In addition, another deficiency with this technique is that it is very difficult to laminate the film with adhesive without the use of expensive and large laminators. Misregistration and air bubbles are two major issues.

There is therefore a need and desire to provide a system and method for forming a print on a substrate, such as a metal substrate, that overcomes the deficiencies noted above with respect to the conventional techniques.

SUMMARY

A printed product according to at least one embodiment includes a printed sheet having a front face and a rear face. A printed image is formed along the rear face. The printed product also includes an adhesive coated substrate, such as a ferrous metal substrate, to which the printed sheet is affixed.

A method for forming a printed product comprises the steps of:
  printing an image on a rear surface of a clear sheet to form a printed sheet;
  positioning the printed sheet relative to an adhesive coated substrate (e.g., ferrous metal substrate) such that the rear surface of the printed sheet faces a top surface of the adhesive coated substrate; and
  affixing the rear surface to a top adhesive layer of the adhesive coated substrate by applying pressure to the printed sheet in a direction toward the adhesive coated substrate.

BRIEF DESCRIPTION OF THE DRAWING FIGURES

DETAILED DESCRIPTION OF CERTAIN EMBODIMENTS

The present invention, at least in one embodiment, is directed to a system and method for forming a print on a substrate, such as a metal substrate, that overcomes the deficiencies noted above that plague the prior techniques used to print on metal substrates.

Figure 1:
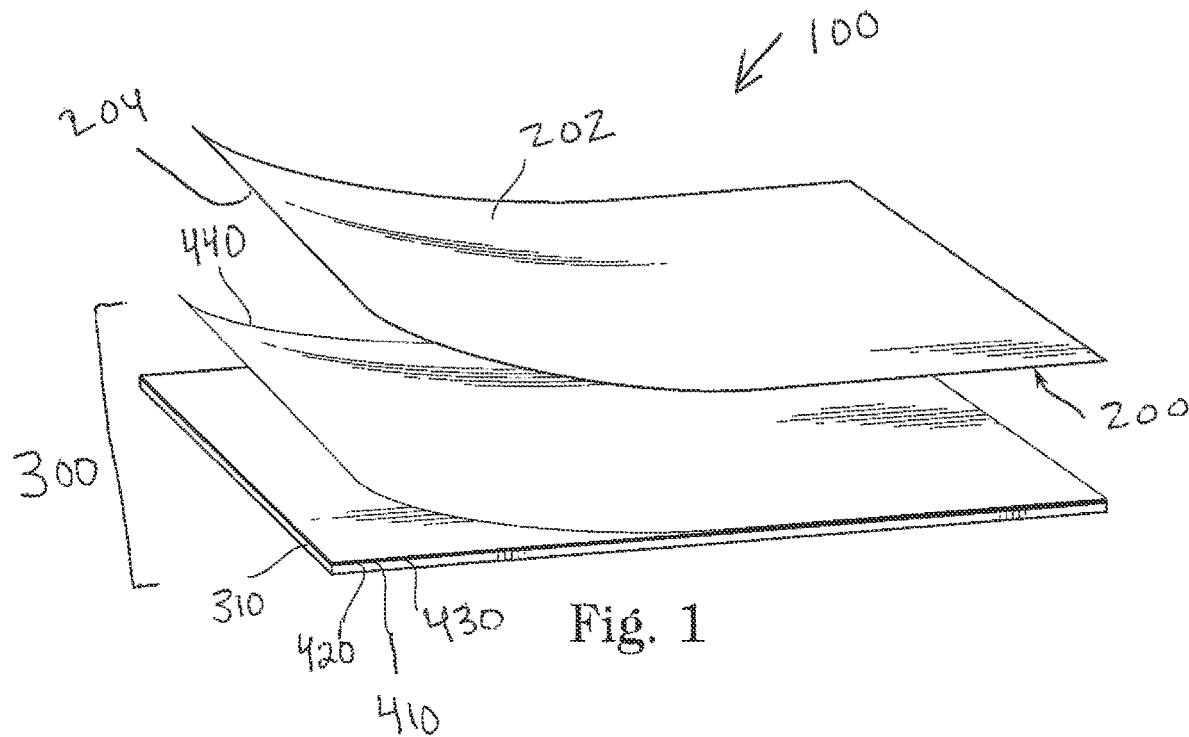
FIG. 1 is a side perspective view, partially exploded, showing a printed sheet for bonding to an adhesive coated substrate, such as a ferrous metal substrate.
Figure 2:
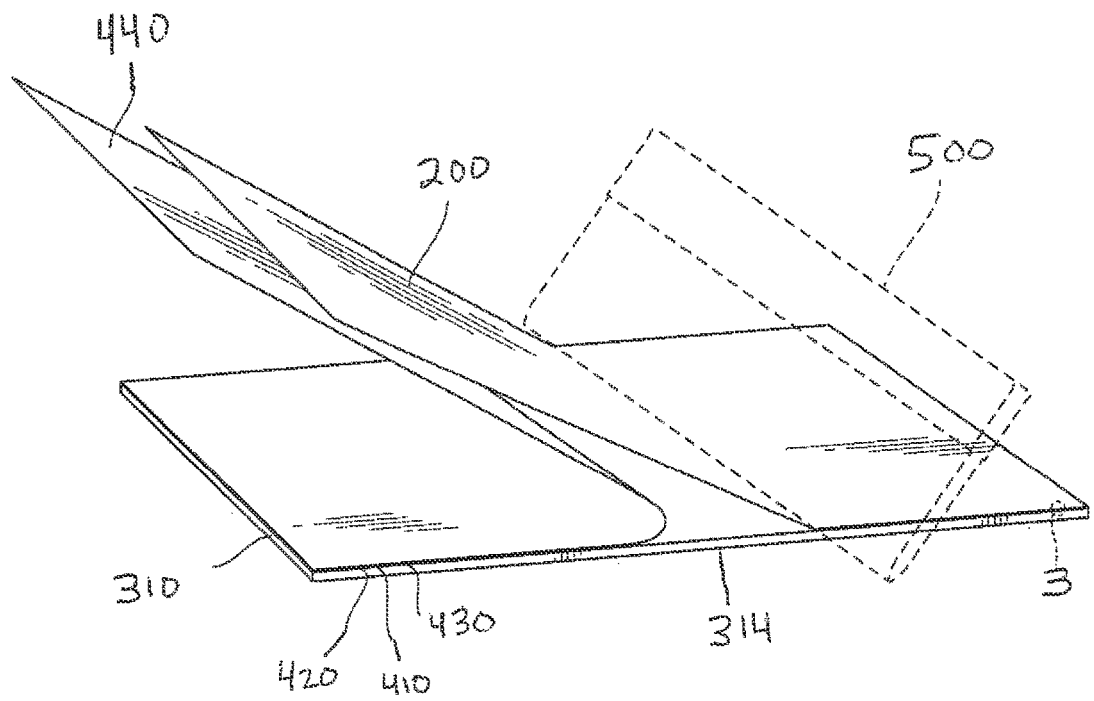
FIG. 2 is a side perspective showing a tool being used to bond the printed sheet to the adhesive coated substrate to form a final product.
Figure 3:
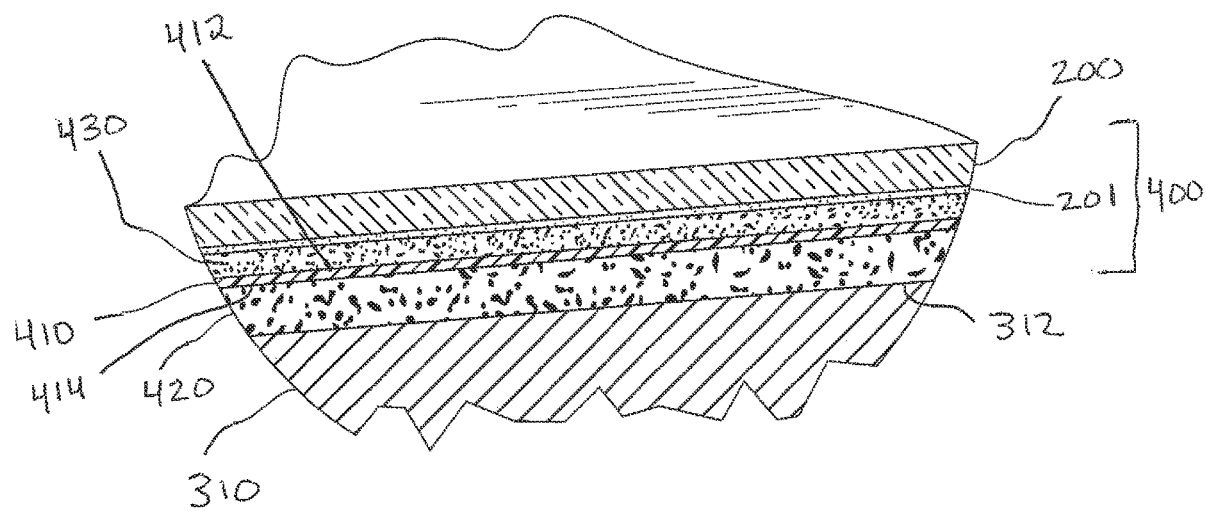
FIG. 3 is an enlarged cross-sectional view of a portion of the final product taken along the circle 3 of FIG. 2.

Now referring to FIGS. 1-3, a printed metal substrate product 100 can be thought of as being formed of two separate components that are joined together in accordance with the teachings of the present invention as described herein. More specifically, one component comprises a printed sheet (print medium) 200 and the other component comprises an adhesive coated substrate 300. It will be understood herein that the printed sheet can take any number of forms and is not limited to a print being formed on the sheet but can include images or objects or materials provided along the sheet using other techniques and not limited to a printing process. Thus, in the broadest sense, the sheet 200 is a sheet that includes an image or indicia for display.

The final product, namely, the printed (metal) substrate product, 100 can come in any number of different shapes and sizes. For example, the final product can have a square shape, rectangular shape, oval shape, circular shape, triangular shape, etc. Likewise, the size of the final product can vary. For sake of convenience and to describe an exemplary implementation, the substrate is described as being a ferrous metal substrate; however, as described herein, it will be appreciated and understood that the substrate is not limited to being formed of a (ferrous) metal and also, the image that is to be displayed is not limited to being a printed image but instead can be formed of a non-printed image, a painted surface, indicia, or other material that is to be displayed in the product 100.

The printed sheet 200 comprises a substrate, such as an optically clear sheet, that has a first side (first face) 202 and an opposite second side (second face) 204. The first side 202 can represent a front side or top face of the printed sheet 200 and the second side 204 can represent a rear side or bottom face of the printed sheet 200 that in one embodiment has an ink receptive layer (e.g., ink jet receptive coating) formed thereon. The printed sheet 200 is flexible and can be formed of any number of different materials that are suitable for its intended use. The printed sheet 200 can thus be in the form of an optically clear flexible plastic sheet and serves as a carrier for the image to be displayed.

In one embodiment, the ink jet receptive coating can be a clay based coating; however, any other commercially available coatings can be used.

A print (printed image) (generally indicated at 201 in FIG. 3) is formed on the second side 204 of the printed sheet 200. The print can be formed by any number of suitable techniques and is formed of inks that are deposited on the second side 204 of the printed sheet 200. The printed sheet 200 includes no adhesive layer or other layers. Unlike the techniques described above with respect to conventional print on metal techniques, the present method forms the print on the rear face (second side 204) of the printed sheet 200 and thus, the print is not formed on an outwardly exposed surface that can be contacted and scratched and smudged. Instead the print is formed on the surface that faces toward the metal substrate itself and thus, the printed sheet 200 itself protects the integrity of the print. As discussed herein, the image to be displayed by sheet 200 is not limited to being a printed image (such as a photo, etc.) but can be in the form of a painted image, objects, or materials deposited onto the sheet 200 for display.

It will also be appreciated that any number of different ink printing techniques can be used to deposit the print on the second side 204. Alternatively, as described herein, an image can be formed on the sheet 200 using other means besides a printed process and thus, the term "printed sheet" not only covers a sheet having an image formed thereon by printing as well as other techniques used to impart the image onto the sheet.

Anti-Reflective, Hard Coated Printed Sheet

Figure 10:
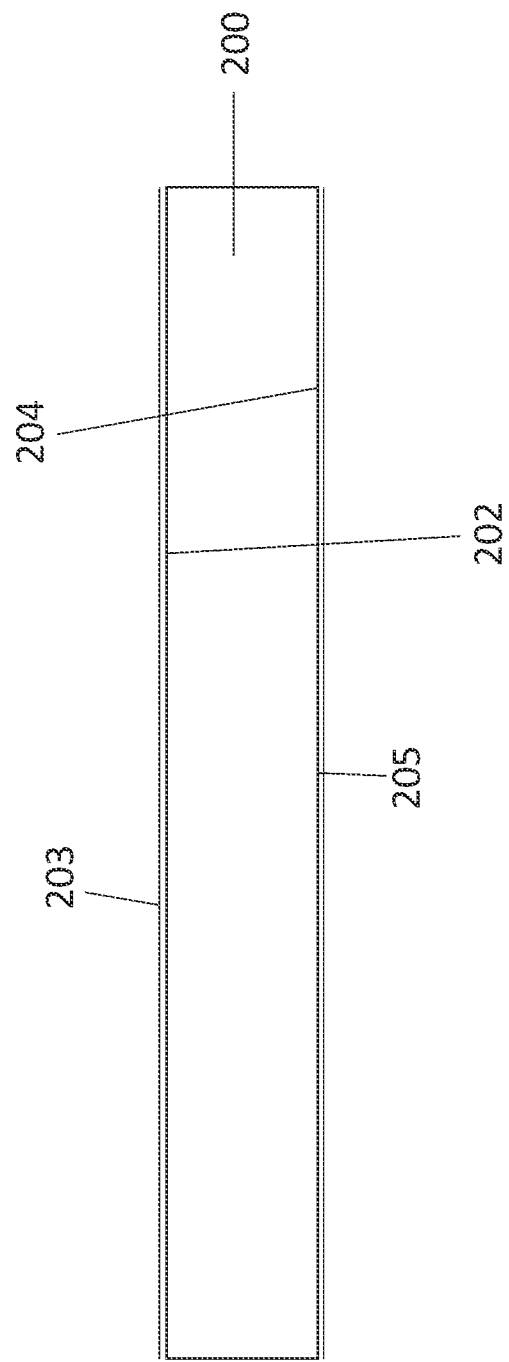
FIG. 10 is a cross-sectional view of a printed sheet that forms a part of the product described herein.

In one embodiment shown in FIG. 10, the printed sheet 200 comprises an anti-reflective, hard coated printed sheet that has a print (ink jet) receptive second side 204. In FIG. 10, the print 201 is eliminated for ease of illustration. Along the first side 202, a first layer (coating) 203 is deposited and along the second side 204, a second layer (coating) 205 is deposited. As described herein, the first layer 203 comprises the scratch resistive, anti-reflective coating that represents the outwardly facing face of the printed sheet 200, while the second layer 205 comprises an aqueous ink receptive coating that permits the print 201 to be formed thereon.

In particular, the printed sheet 200 has an applied coating that offers the desired properties of being anti-reflective and also is a hard coating (increased hardness). In one embodiment, the printed sheet 200 comprises a polyethylene terephthalate (polyester) substrate that has a coating applied thereto to at least one surface, such as the first side 202 that faces outward.

The coating can be applied to the base material (e.g., PET) using any number of different techniques. For example, a reverse gravure process can be used to applied the coating to the substrate. As is known, a gravure coating process, used for producing continuous coatings, uses a gravure roller with depressions or recesses on the surface which control the thickness and uniformity of the coated layer. Ideally the fluid is uniformly "picked out" of the recesses and transferred to the substrate. Typically, these recesses are in a regular pattern in the region where a continuous coating is desired. A reverse gravure coater is one technique for applying the coating and the operation of a gravure coater is similar to that of a differential speed coater but the gravure roller surface moves in the opposite direction to the web (substrate).

The coating applied to the base substrate offers a number of advantageous properties including but not limited to: (1) excellent abrasion and scratch resistance; (2) outstanding for embossing and die cutting; (3) excellent chemical resistance to common household cleaners and industrial solvents; (4) second surface printability with solvent and UV inks, including clearing inks; (5) first surface printability with clear, matte and texture UV cure inks; and (6) excellent anti-glare (anti-reflection) properties. The coating is thus preferably a protective hardcoat offering superior abrasion, scratch, and chemical resistance plastic coating.

The sheet 200 thus offers a novel product element in that one surface is hardcoated to offer the above-mentioned properties, including but not limited to anti-reflective, scratch resistance, etc., and the opposite surface has an aqueous ink receptive coating that permits the print to be formed thereon.

The adhesive coated metal substrate 300 (or substrate formed of another material) thus represents the structure to which the printed sheet 200 is attached to form the complete, final print product.

The adhesive coated metal substrate 300 is formed of a number of different materials and/or structures and in particular, is formed of a base metal substrate 310. The base metal substrate 310 can be formed of a suitable metal and in one embodiment, the base metal substrate 310 is formed of aluminum and more particularly, of anodized aluminum. As understand, anodizing is an electrolytic passivation process used to increase the thickness of the natural oxide layer on the surface of the metal substrate. Aluminum alloys are anodized to increase corrosion resistance and to allow dyeing (coloring), improve lubrication, or improved adhesion. The anodic layer is non-conductive.

The base metal substrate 310 has a first side (first face) 312 and an opposite second side (second face) 314. The first side 312 represents a front side or top face of the base metal substrate 310 and the second side 314 represents a rear side or bottom face of the base metal substrate 310. The base metal substrate 310 is a rigid substrate; however, depending upon a thickness thereof, it may be possible to bend the base metal substrate 310 when applying a sufficient force thereto.

It will be appreciated that the adhesive coated metal substrate 300, and in particular, the base metal substrate 310 thereof, can come in any number of different shapes and sizes.

The adhesive coated metal substrate 300 also includes an adhesive component, which is generally shown at 400, for adhering the printed sheet 200. The adhesive component 400 is configured to act as the bonding agent to bond (attach) the printed sheet 200 to the first side 312 of the base metal substrate 310. Applicant advantageously has discovered that the present construction eliminates the need for an industrial sized laminator to laminate two structures as was previously done and led to increased cost and complexity.

The adhesive component 400 comprises a multi-layer adhesive structure that is disposed along the first side 312 of the base metal substrate 310. The adhesive component 400 comprises a carrier 410 that is formed of an optically clear material and can be a flexible thin plastic sheet. For example, the flexible plastic sheet can be formed of PET (polyethylene terephthalate) or any other suitable material. The carrier 410 includes a first side (first face) 412 and an opposite second side (second face) 414. The first side 412 represents a front side or top face of the carrier 410 and faces away from the base metal substrate 310 and the second side 414 represents a rear side or bottom face of the carrier 410 and faces toward the base metal substrate 310.

In accordance with the present invention. The adhesive component 400 includes a first adhesive 420 that can be in the form of a first adhesive layer or bottom adhesive layer. The first adhesive 420 is disposed along the second side 414 of the carrier 410 and is intended to act as the bonding agent that fixedly bonds the adhesive component 400 to the base metal substrate 310. The first adhesive 420 can be in the form of a permanent adhesive layer that is of a type that permanently bonds two structures to one another. Any number of different permanent adhesives can be used as the first adhesive 420. For example, one suitable permanent adhesive is permanent acrylic (pressure sensitive) adhesive. Preferably, the first adhesive 420 covers the entire area of the second side 414.

The adhesive component 400 also includes a second adhesive 430 that can be in the form of a second adhesive layer or a top adhesive layer. The second adhesive 430 is disposed along the first side 412 of the carrier 410 and thus faces away from and is not in contact with the base metal substrate 310. Instead, the second adhesive 430 covers the first side 412 of the carrier 410. The second adhesive 430 can be in the form of a low-tack adhesive layer that is disposed along the first side 412. As described herein, the low-tack properties of the second adhesive 430 permits repositioning of the printed sheet 200 on the base metal substrate 310. The consistency and properties of the second adhesive 430 are such that air bubbles can be removed therefrom when the printed sheet 200 is applied thereto and a tool (described below) is used to apply a force to the printed sheet 200 and smooth out the printed sheet 200.

Any number of different adhesives can be used as the second adhesive 430. For example, one low-tack adhesive can be a removable acrylic (pressure sensitive). The low-tack adhesive 430 is forgiving in that it is a gel-like material and is somewhat impervious to air bubbles (which was a common undesired byproduct of using an industrial laminator). As described below, the low-tack adhesive 430 allows the user to apply the printed sheet 200 using a light amount of pressure as opposed to using a nip-roller/laminator as was traditionally used.

The adhesive component 400 further includes a releasable first release layer 440 that is disposed over the second adhesive 430 to protect and preserve the second adhesive 430 until time for bonding the printed sheet 200 to the adhesive coated metal substrate 300. Any number of different first release layers 440 can be used and in one embodiment, the first release layer 440 is in the form of an HDPE (high-density polyethylene) material.

The adhesive component 400 in combination with the base metal substrate 310 forms a structure that can be referred to as being a prelaminated metal substrate.

Process for Bonding the Printed Sheet to the Adhesive Coated (Metal) Substrate

In accordance with the present invention and as shown in FIG. 2, a method is provided for bonding the printed sheet 200 to the adhesive coated metal substrate 300. To prepare the adhesive coated metal substrate 300, the first release layer 440 is slowly removed to thereby expose the second adhesive 430. The printed sheet 200 is positioned such that the second side 204 that contains the print faces down toward the exposed second adhesive 430. The second side 204 is placed in intimate contact with the second adhesive 430 and a tool 500 is used to apply pressure and apply the printed sheet 200 to the exposed second adhesive 430. In accordance with one embodiment, the tool 500 is in the form of a squeegee that has a handle portion and a flexible blade portion that is configured to contact and ride along the first side (upward facing surface) 202 of the printed sheet 200 to apply a downward force to the printed sheet 200 to press into contact with the exposed second adhesive 430. Since the second adhesive 430 is preferably a low-tack adhesive, if needed, the printed sheet 200 can be repositioned relative to the base metal substrate 310. However, the second adhesive 430 allows the printed sheet 200 to be fixedly attached to the base metal substrate 310.

The squeegee 500 can have a slot 510 formed therein to all the printed sheet 200 to be fed therethrough such that the printed sheet 200 can be held back as the first release layer 440 is removed and the squeegee 500 is moved along the first side 202 of the printed sheet 200. The squeegee 500 also has a flexible blade 520 which contacts the printed sheet 200.

Unlike conventional metal substrate print products, the printed image or object or material for display in the present invention is not exposed and accessible along the printed sheet 200. Instead, the printed image is on the rear surface (second face 204) of the printed sheet 200 and thus cannot be scratched or smudged or otherwise marred.

In another aspect as shown in FIGS. 4-7, a jig 600 can be provided to assist the user in attaching the printed sheet 200 to the adhesive coated metal substrate 300. The jig 600 has a body that has a recessed portion 610 which is sized and shaped so as to be complementary to the adhesive coated metal substrate 300. Thus, the recessed portion 610 can be in the form of a rectangular shaped recessed portion in which the adhesive coated metal substrate 300 sits.

Figure 4:
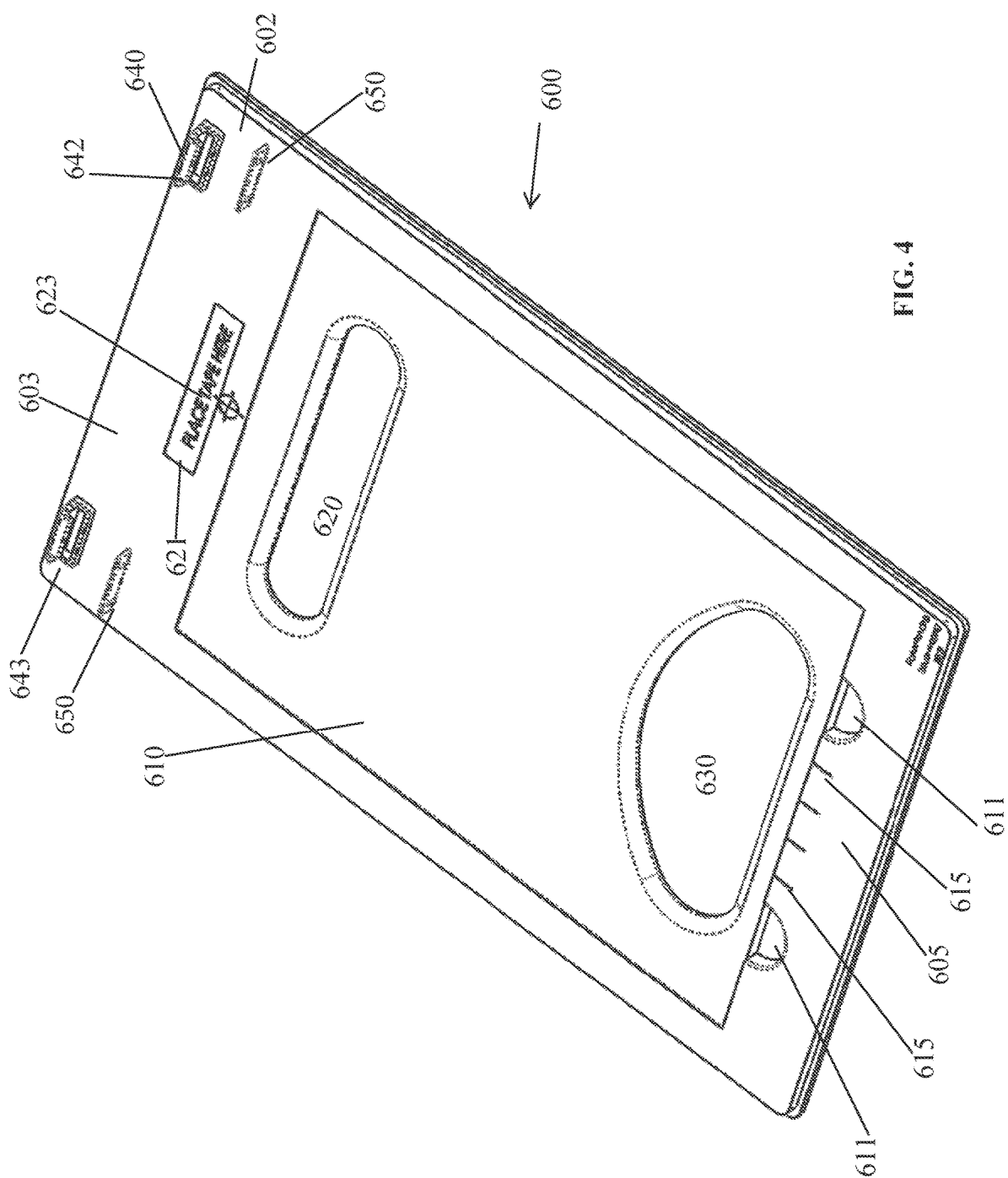
FIG. 4 is a top perspective view of a jig.
Figure 5:
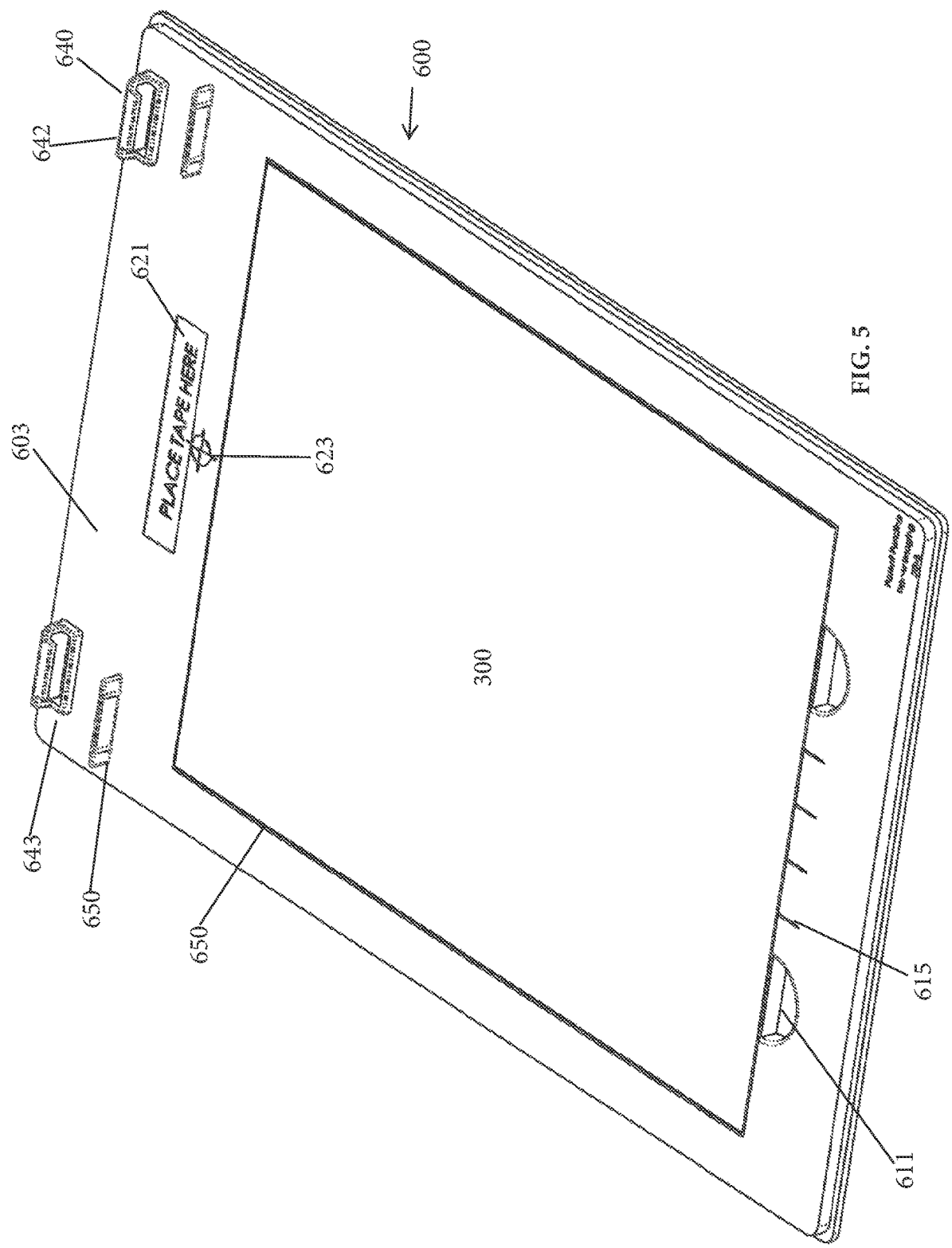
FIG. 5 is a top perspective view of the jig with a substrate disposed in a recessed area formed therein.
Figure 6:
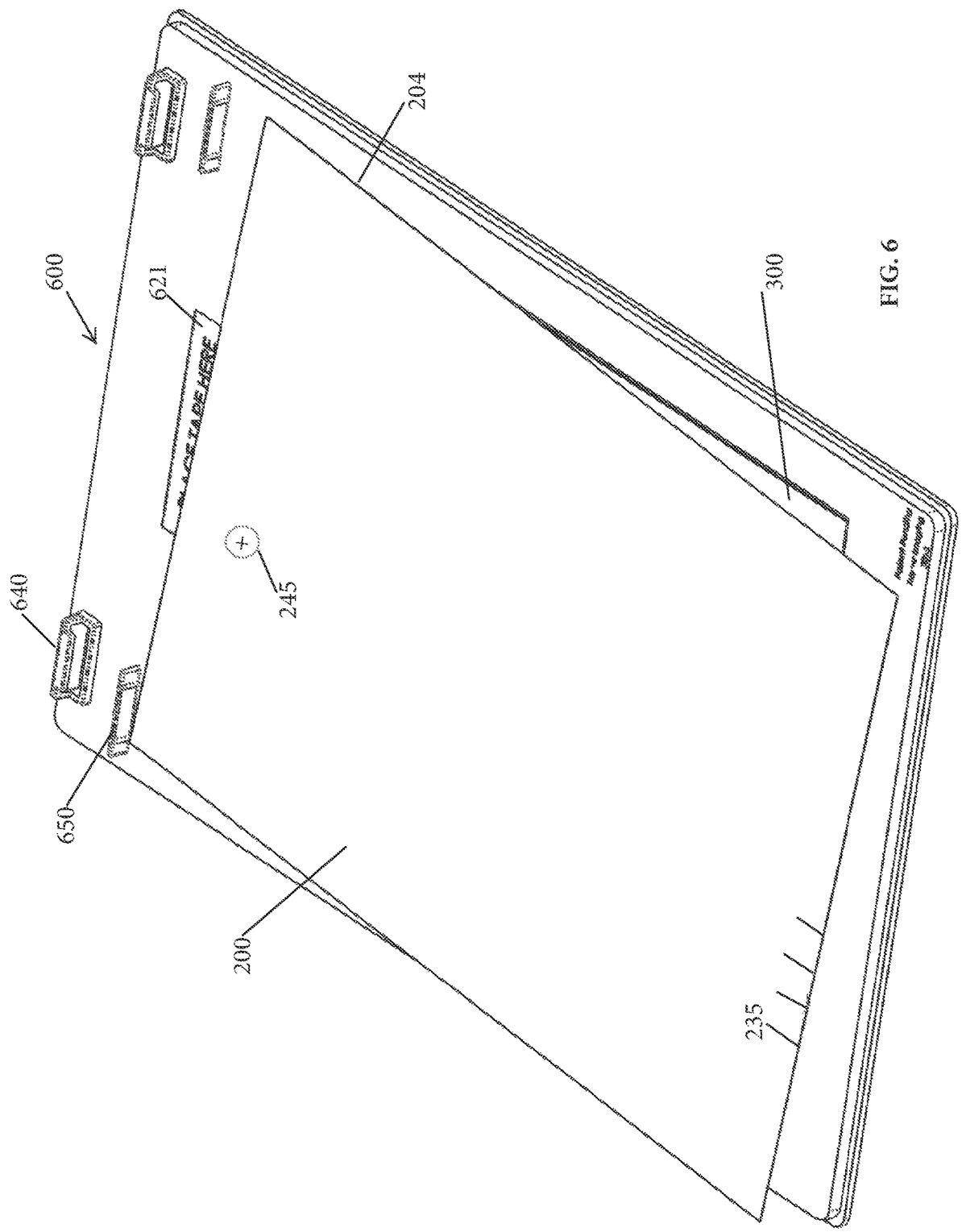
FIG. 6 is a top perspective view of the jig with a printed sheet being disposed over the jig.

As shown in FIG. 4, the jig 600 has a top surface 602 along which the recessed portion 610 opens. There is also a peripheral border formed around the recessed portion 610. Within the recessed portion 610, a first opening 620 is formed, as well as a second opening 630. The first opening 620 is located proximate a first end and the second opening 630 is located proximate a second end opposite the first end. As illustrated, the first opening 620 and the second opening 630 have different shapes and/or sizes. The first opening 620 has an oblong shape and is configured such that a user can access the underside of the base metal substrate 310 and apply a force thereto for dislodging the adhesive coated metal substrate 300 and the attached printed sheet 200 from the recessed portion 610.

The second opening 630 has a different shape and is sized and shaped so that a person's hand can be inserted so that the second opening 630 acts as part of a handle which allows the user to easily carry the jig 600. The illustrated second opening 630 has a curved edge and an opposing flat edge against which the user's fingers can rest when carrying the jig 600. The jig 600 can also be hung using this opening.

The top surface 602 of the jig 600 has a number of features that assist in the use of the jig 600. In particular, the top surface 602 has a first portion 603 that is formed along a first end of the jig 600 and the top surface 602 has a second portion 605 that is formed along a second end of the jig 600. Both the first portion 603 and second portion 605 are located outside of the recessed portion 610. Within the second portion 605, there is one or more recesses 611 that are in communication with the recessed portion 610 and are positioned along the second end of the recessed portion 610 so that when the base metal substrate 310 is inserted into the recessed portion 610, the second end of the base metal substrate 310 is accessible and exposed within the one or more recesses 611. In the illustrated embodiment, there are two recesses 611 with each recess 611 having a semi-circular shape.

Between the recesses 611 within the second portion 605, there is a plurality of first locating indicia 615 to assist in positioning of the printed sheet 200. The illustrated first locating indicia 615 are in the form of four spaced lines (line segments). It will be appreciated that more or less than four lines can be used. The lines can be recessed in the jig surface or they can be printed onto the top jig surface.

The first portion 603 also has a number of features. For example, there can be a first area 621 that is intended to mark an area in which a piece of tape can be disposed in order to temporarily hold the printed sheet 200 in place above the adhesive coated metal substrate 300. Below the first area 621 there is a second locating indicia 623 in the form of a crosshair symbol. The second locating indicia 623 is located between the first area 621 and one end (top edge) of the recessed portion 610 of the jig. The second locating indicia 623 can be recessed relative to the top surface or can be printed thereon or otherwise formed. The use of these two locating features is described below.

The jig 600 also includes retaining features to detachably hold/retain the squeegee 500 when not in use. For example, along one end of the jig within the first portion 603 above the first area 621 there is a pair of clips 640 that are integrally formed as part of the jig. The clips 640 can be L-shaped clips with a top wall 642 that defines a space 643 located therebelow and into which the squeegee 500 is inserted. The jig 600 also includes a pair of upstanding protrusions 650 that are spaced apart and generally located below the clips 640. The protrusions 650 are shaped and sized to be received within the slot 510 formed in the squeegee 500 for holding the squeegee 500 in place. The illustrated protrusions 650 have a rectangular shape. The protrusions 650 can be located so that they are received within end regions of the slot 510.

Figure 8:
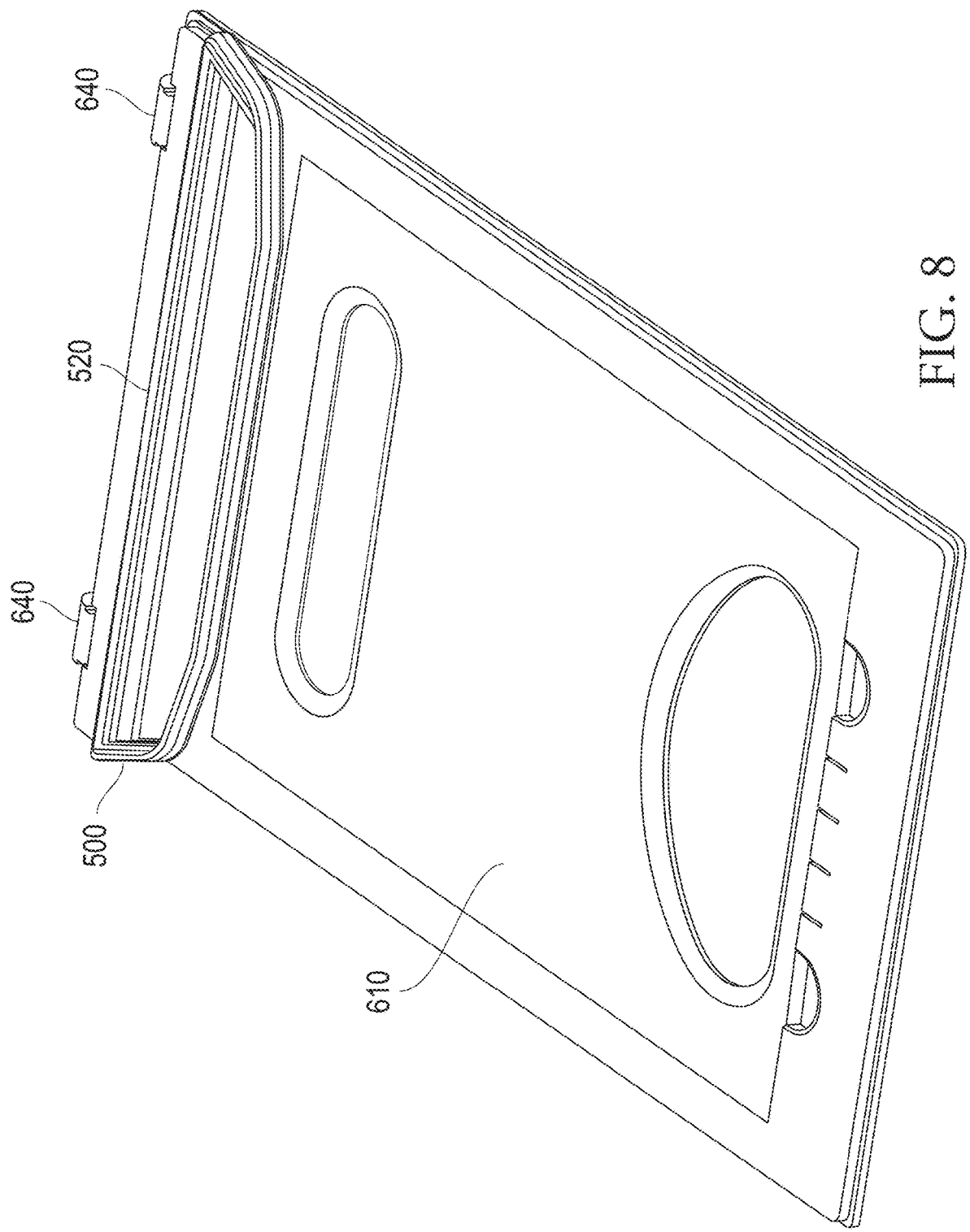
FIG. 8 is a top perspective view of the jig with a squeegee tool attached thereto.
Figure 9:
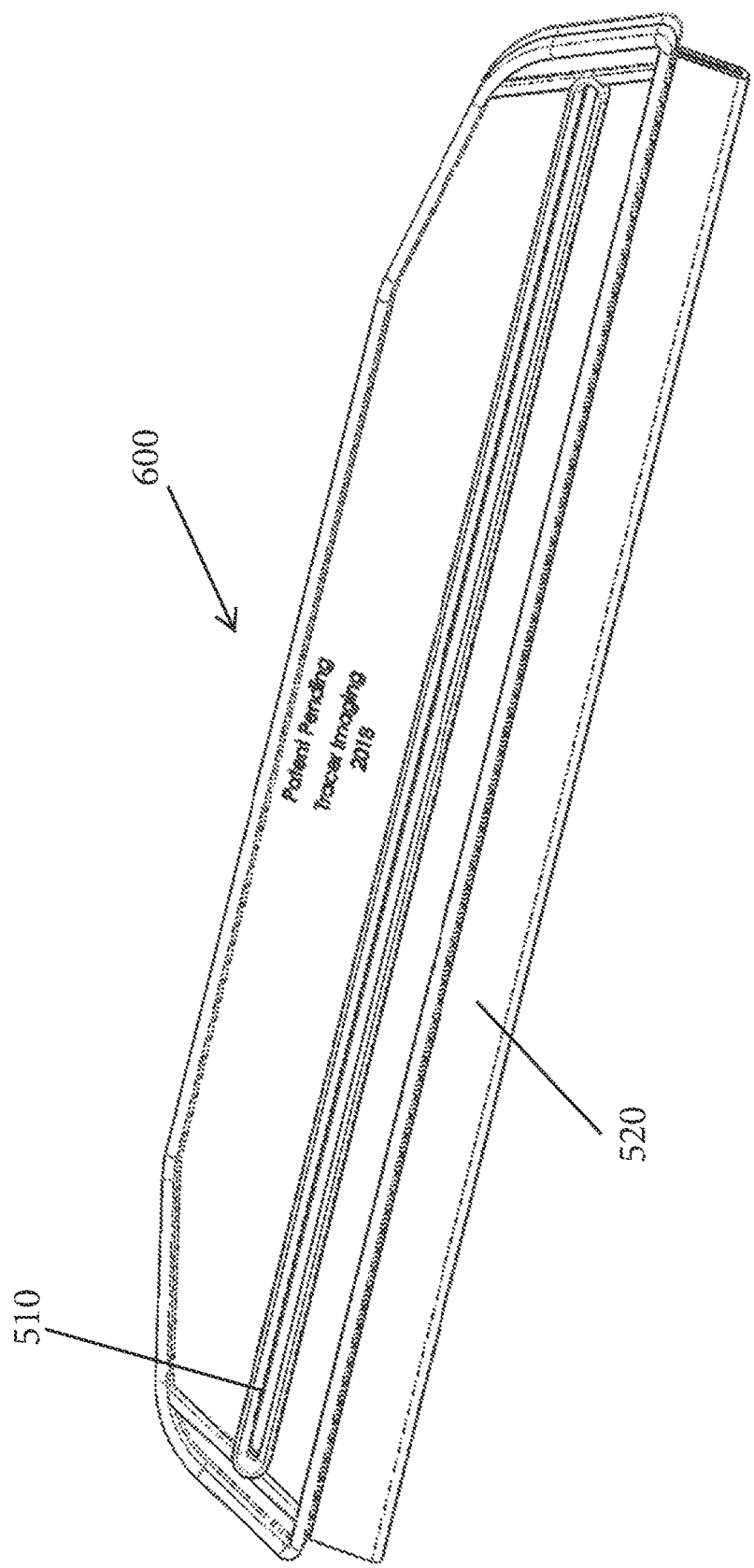
FIG. 9 is a perspective view of the squeegee.

To detachably retain the squeegee 500 on the jig 600, the squeegee 500 is positioned on its side and the blade 520 is inserted into the spaces 643 of the two clips 640 and is frictionally held in place below the top walls 642. After positioning the blade 520 in place, the squeegee 500 is lowered and the protrusions 650 are received within the slot 510 resulting in the body of the squeegee being retained on the jig 600. FIG. 8 shows the squeegee 500 in this retained position on the jig 600.

Alternative Metal Substrate

In another embodiment, the base metal substrate 310 is not formed from a brushed aluminum material but instead is formed from a material other than a brushed aluminum material; however, the material has been processed so that it has a brushed aluminum-like appearance. As is known in the industry, brushed aluminum is quite expensive compared to other materials; however, it has a very attractive appearance due to its brushed and reflective nature and there is heavily used. One other disadvantage of brushed aluminum is that is a non-ferrous material and therefore, objects cannot be mounted to aluminum with the use of magnets.

In accordance with one embodiment of the present invention, the base metal substrate 310 can comprise a ferrous metal substrate that has been processed to provide an outer appearance similar to a brushed aluminum appearance. As is known, a brushed metal look comprises a unidirectional satin finish. It is desired to produce a metal substrate that is not streaky and is of photo quality and therefore, processing of the metal can create a consistent background that is desired for the applications described herein.

Besides offering an attractive appearance, one of the benefits of using a printed ferrous metal substrate is that the final, finished product 100 can be hung using magnets since magnets will attach to the ferrous metal and as mentioned herein, the cost of the ferrous metal material is significantly less than the cost of aluminum.

In accordance with one processing technique, the starting material to form the base metal substrate 310 is a sheet of 1008 steel. The base steel is either hot dipped galvanized (HDG) or electro-galvanized (EG) and is typically formed as a coil. As is well known, a galvanized sheet is a cold rolled carbon steel sheet coated with a layer of zinc on two sides by a continuous galvanizing process. The process results in a layer of zinc deposited on each side of the steel sheet that is tightly adhering to the steel through the formation of an iron-zinc alloy bonding layer that is formed by a diffusion process.

In order to impart the brushed aluminum look to the galvanized steel sheet, the galvanized steel sheet is finished by a gravure printing process in which steel sheet is gravure printed and is then clear coated. The gravure printing process imparts the brushed aluminum look and the clear coating acts a protectant layer.

As is generally known, in gravure printing, an image is acid-etched on the surface of a metal cylinder in a pattern of cells. The cells are recessed into the cylinder. The cylinder is etched with cells of different depths. These cells hold the ink that is transferred to the substrate. The cells are filled with ink and another substrate, in this case the base metal substrate 310, is pressed against the inked cylinder on a rotary press, and the image is transferred directly to the substrate. This is one technique for imparting the brushed aluminum look.

After clear coating the gravure printed HDG steel sheet, the formed non-aluminum base metal substrate 310 is then recoiled. Additional processing, including cutting and deburring, can be subsequently performed.

Other metal options include but are not limited to a ferritic grade of stainless, e.g., 430, which make the substrate very magnetic (either a 2b or #4 finish) or a cold rolled, tinplated, bright finish, low carbon steel can be used.

Matte Finish

In another embodiment, the top surface of the base metal substrate 310 can include a coating that is designed to provide a matte finish to the top of the base metal substrate 310. This option provides a different finished look for the base metal substrate 310.

Whiteness of Substrate Finish

In another embodiment, a coating can be applied to the metal substrate to increase the whiteness of the background. Standard ink jet printing applies depositing CMYK inks onto a substrate. CMYK refers to four inks used in printing, namely, cyan, magenta, yellow and key. The CMYK model works by partially or entirely masking colors on a lighter, usually white background. The ink reduces the light that would otherwise be reflected. In the case of using a metal substrate, the metal substrate does not have a white color and since the CMYK inks do not impart whiteness, a coating should be added to the substrate to increase the "whiteness". This coating can be a white colored coating or silver metallic coating or other suitable coatings and in particular, the coating can be a PVDF, polyester or acrylic resin continuously applied at coil level utilizing a roller coating method. Aluminum chips or pigmented mica are added to resin to create a metallic look.

Figure 7:
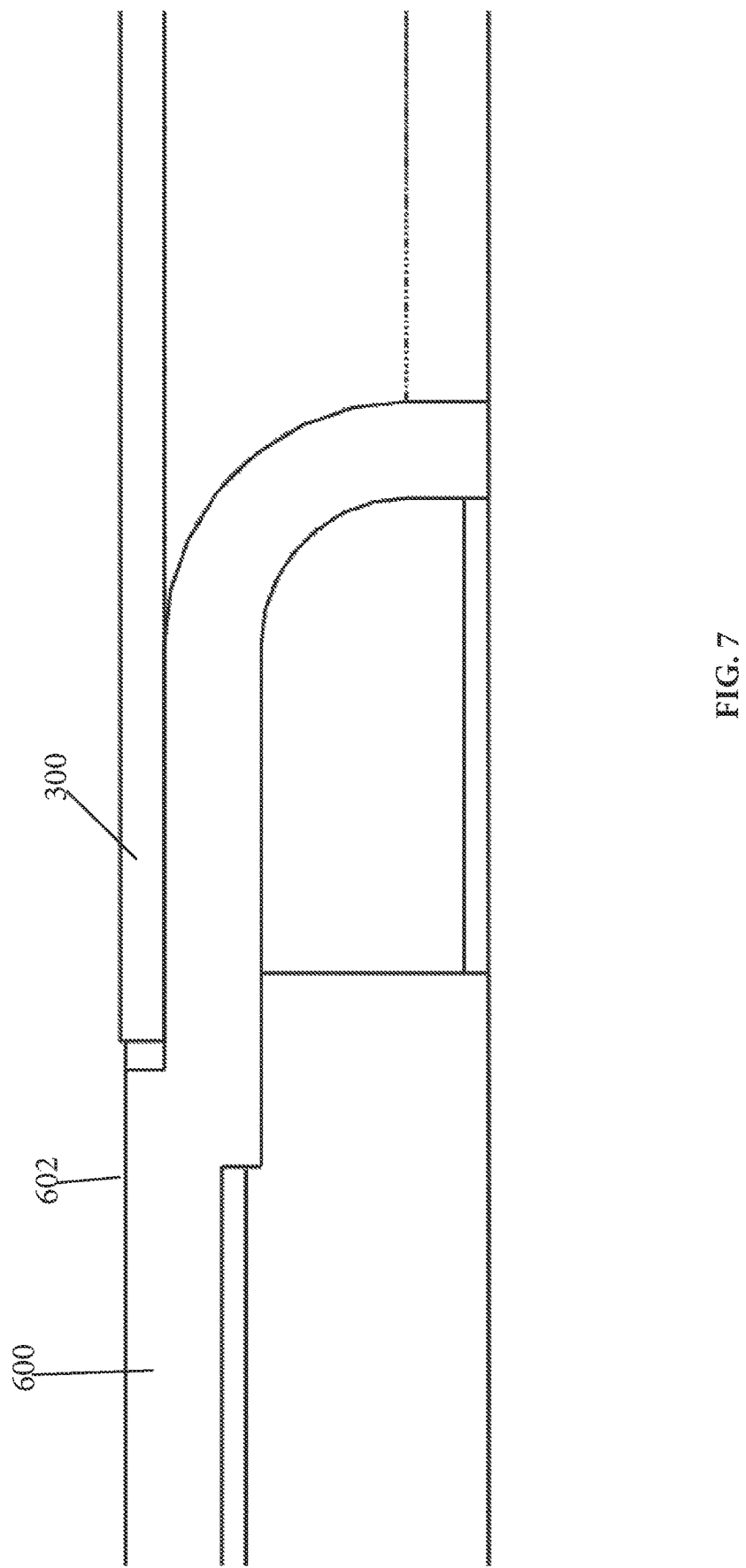
FIG. 7 is a partial cross-sectional view of the jig with the substrate in the recessed area.

Method for Applying the Printed Sheet 200 to the Adhesive Coated Metal Substrate First, the adhesive coated metal substrate 300 is inserted into the recessed portion 610 of the jig 600. When the adhesive coated metal substrate 300 is disposed in the recessed portion 610, it sits proud in that the top surface of the adhesive coated metal substrate 300 sits slightly above the top surface 602 of the jig as shown in FIG. 7. As discussed above, the release layer 440 is thus exposed above the top surface 602 of the jig. Since the release layer 440 sits above top surface, when it is removed, the exposed adhesive also is preferably above the top surface 602 so that the printed sheet 200 is layered on top of the exposed adhesive at a location slightly above the top surface 602.

The printed sheet 200 is then positioned. It will be appreciated that the printed sheet 200 can have additional markings to assist the user in properly positioning the printed sheet 200 so that the printed image is facing downward toward the jig 600. For example, the printed sheet 200 can have indicia or markings that make it immediately clear which side is facing up. For example, the printed sheet 200 can have the words "top" or "front" or both words printed on the sheet in a cut-off area that is later removed. This marking(s) allows the user to immediately understand where and how to place the printed sheet 200.

Once the printed sheet 200 is properly positioned (with printed image facing downward), the printed sheet 200 is registered relative to the jig 600. The printed sheet 200 includes third and fourth locating indicia (markings) 235, 245 that are complementary to the first locating indicia and second locating indicia 615, 623, respectively. When properly registered, the third locating indicia 235 is placed in registration with the first locating indicia 615 and the fourth locating indicia 245 is placed in registration with the second locating indicia 623. The third locating indicia 235 can thus be in the form of spaced lines printed on the sheet 200 and the fourth locating indicia 245 can be in the form of a crosshair symbol printed on the sheet 200.

Once all of the indicia are placed in registration, the printed sheet 200 is temporarily secured to the jig 600 by placing a piece of tape in the first area 621 with the tape extending across an edge (end) of the printed sheet 200. To securely attach the printed sheet 200 to the adhesive coated metal substrate 300, the unsecured end of the printed sheet 200 is lifted and fed through the slot 510 of the squeegee 500 (i.e., the unsecured end is folded back on top of the printed sheet in a direction toward the secured end of the printed sheet). By inserting the printed sheet 200 through the slot 510, the user can still use the squeegee 500 with one hand. This action exposes the release layer 440 that extends across the top of the adhesive coated metal substrate 300. The release layer 440 is removed by using the user's other hand and pulling it in a direction away from the secured end of the printed sheet 200. This action reveals the second adhesive 430 and then the user continuously meters the printed sheet 200 back out of the slot 510 onto the exposed second adhesive 430 and the squeegee 500 is used to apply a downward force to the printed sheet 200 to press the printed sheet 200 onto the exposed second adhesive 430.

As mentioned above, the second side 204 that contains the print faces down and is secured to the exposed second adhesive 430.

The second adhesive 430 is a "gooey" consistency thereby allowing air bubbles to be taken out when the printed sheet 200 is applied thereto and the squeegee 500 is used to apply a force to the printed sheet 200 and smooth out the printed sheet 200.

The user continues to remove the release layer 440 and applies the printed sheet 200 to the second adhesive 430. The squeegee 500 is slowly moved along the exposed top surface of the printed sheet 200 to adhere the printed sheet 200 to the second adhesive 430 and remove any bubbles between the printed sheet 200 and the adhesive coated metal substrate 300. The resulting product is a reverse printed sheet 200 securely adhered to the adhesive coated metal substrate 300.

Alternatively, the jig 600 can include two posts that accept the printed sheet 200. The printed sheet 200 thus can have two holes formed therein. The two holes can be formed using any number of techniques including use of a hole puncher. It will be appreciated that the printed sheet 200 can have a perforated portion in which the two holes are formed such that once the print portion of the printed sheet 200 is affixed to the adhesive coated metal substrate 300, the perforated portion can be removed. The two holes are designed to align the printed sheet 200 in perfect (optimal) position relative to the adhesive coated metal substrate 300 and on top of the adhesive coated metal substrate 300.

It will also be appreciated that the subcomponents described herein, such as the adhesive component 400 and the sheet 200 (including the two-sided coated version), can be used also on non-metal surfaces, such as glass prints, acrylic prints, natural wood prints, ceramic, etc., as well as the metal surfaces described herein.

In other words, the main (base) substrate is not limited to being base metal substrate 300 but instead can be formed of any number of other materials including but not limited to glass, plastic substrates, such as acrylic substrates, wood and any other suitable material that provides a backing to which the print can be adhesively bonded using techniques described herein.

In the event that the base substrate is glass or a transparent acrylic material, the order of the assembled parts is different than that shown in FIG. 1. In particular, the order of the parts is generally reversed in that the bottom layer is the sheet 200 that has the print (image) formed of the top surface and the adhesive component 400 is provided and bonded to the print side of the sheet 200 and since the base substrate is transparent, as in the case of a glass or acrylic substrate, this type of base substrate is laid over the permanent adhesive side of the adhesive component 400 with the print image on the sheet 200 being below (behind) the base substrate. In other words, the base substrate is actually the structure that the viewer views the print image through and is thus the forward most part of the assembly which is in direct contrast to the implementation shown in FIG. 1 in which the base substrate 310 is the rearward most part of the assembly. In any event, the print itself is still protected since it faces inward toward the base substrate and this arrangement can offer a fully transparent look since all of the parts can be formed of transparent materials.

Accordingly, the base substrate 310 is not limited to being formed of a metal material but can be formed of any number of materials, such as those discussed herein. The assembly process is the same or essentially the same in that the print sheet and adhesive component (double sided adhesive carrier sheet) is used to mount the print sheet to the substrate, which again can be in the form of a metal sheet or other material, such as glass or plastic material (transparent or opaque in nature).

Alternative Jig Constructions

Figure 11:
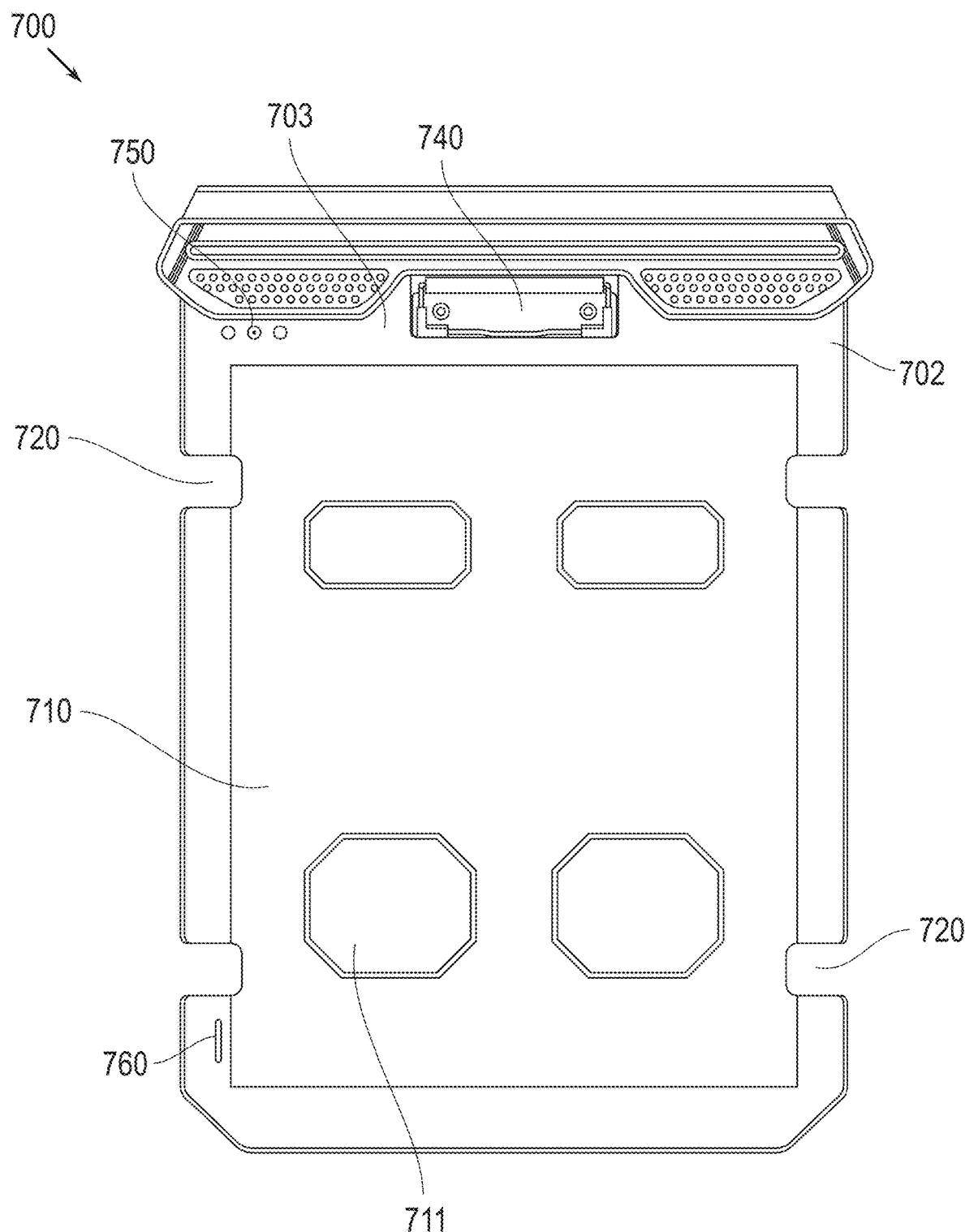
FIG. 11 is top perspective view of a jig and squeegee tool according to another embodiment.

In another aspect as shown in FIG. 11, a jig 700 can be provided to assist the user in attaching the printed sheet 200 to the adhesive coated metal substrate 300. The jig 700 is similar to the jig 600 and includes a main body that has a recessed portion 710 which is sized and shaped so as to be complementary to the adhesive coated metal substrate 300 shown in the present figures. Thus, the recessed portion 710 can be in the form of a rectangular shaped recessed portion in which the adhesive coated metal substrate 300 sits.

As shown in FIG. 11, the jig 700 has a top surface 702 along which the recessed portion 710 opens. There is also a peripheral border formed around the recessed portion 710. Within the recessed portion 710, one or more openings 711 are formed. The openings 711 allow for venting and also provides access to the underside of the base metal substrate 310 and reduced weight of the jig.

The top surface 702 of the jig 700 has a number of features that assist in the use of the jig 700. In particular, the top surface 702 has a first portion 703 that is formed along a first end of the jig 700. The first portion 703 is located outside of the recessed portion 710.

Along opposing sides of the jig 700 are a plurality of notches (slots) 720 and in particular, in the illustrated embodiment, each side of the jig 700 has a pair of notches 720. In the illustrated embodiment, each notch 720 is U-shaped. One end of the notch 720 lies within the recessed portion 710 and thus allows access to the adhesive coated metal substrate 300 for dislodging the completed product by applying a force to the underside of the adhesive coated metal substrate 300 (e.g., as by using a fingertip or tool, etc.).

The first portion 703 also has a number of features. For example, a fixation member 740 can be provided for temporarily locating and holding the printed sheet 200 in place above the adhesive coated metal substrate 300. In the illustrated embodiment, the fixation member 740 is in the form of a clip, similar to a traditional school clip board, that is spring biased to a closed position and is open by applying a force to the clip. The fixation member 740 in the illustrated embodiment is centrally located. The fixation member 740 is thus located along a top edge of the recessed portion 710.

The first portion 703 also includes other locating features such as a first locating member 750 in the form of a protrusion (e.g., a round pin) that protrudes upwardly from the top surface. The protrusion 750 is located outside of the recessed portion 710 along the top edge thereof and is intended to be received within a complementary locating hole formed in the printed sheet 200. For example, a hole can be punches in the upper left corner of the printed sheet 200 and then the printed sheet 200 is placed on the protrusion 750 to couple the printed sheet 200 to the jig 700. The coupling allows for free rotation of the printed sheet 200 relative to the jig 700.

A second locating member 760 is provided and is in the form of a rib that is located along one side of the jig 700. In the illustrated embodiment, the second locating member 760 is positioned along the left side near the bottom left corner outside of the recessed portion 710. The second locating member 760 is in the form of a linear raised rib. When the second locating member 760 is in the illustrated position, the second locating member 760 is positioned to seat against the bottom left corner of the printed sheet 200. The printed sheet 200 is first coupled to the protrusion 750 by passing the protrusion 750 through the hole formed in the left corner of the printed sheet 200 and then the printed sheet 200 is swiveled (rotated) about the protrusion 750 until the left side (edge) of the printed sheet 200 is placed against the second locating member 760. This positioning of the printed sheet 200 ensures that the printed sheet 200 is in the desired registration relative to the underlying metal substrate 300.

It will be appreciated that the size, shape, and/or position of the second locating member 760 can be varied and the illustrated characteristics are only exemplary in nature and not limiting. For example, the second locating member 760 can be located along the right side of the jig 700 (right side of the printed sheet 200).

Figure 12:
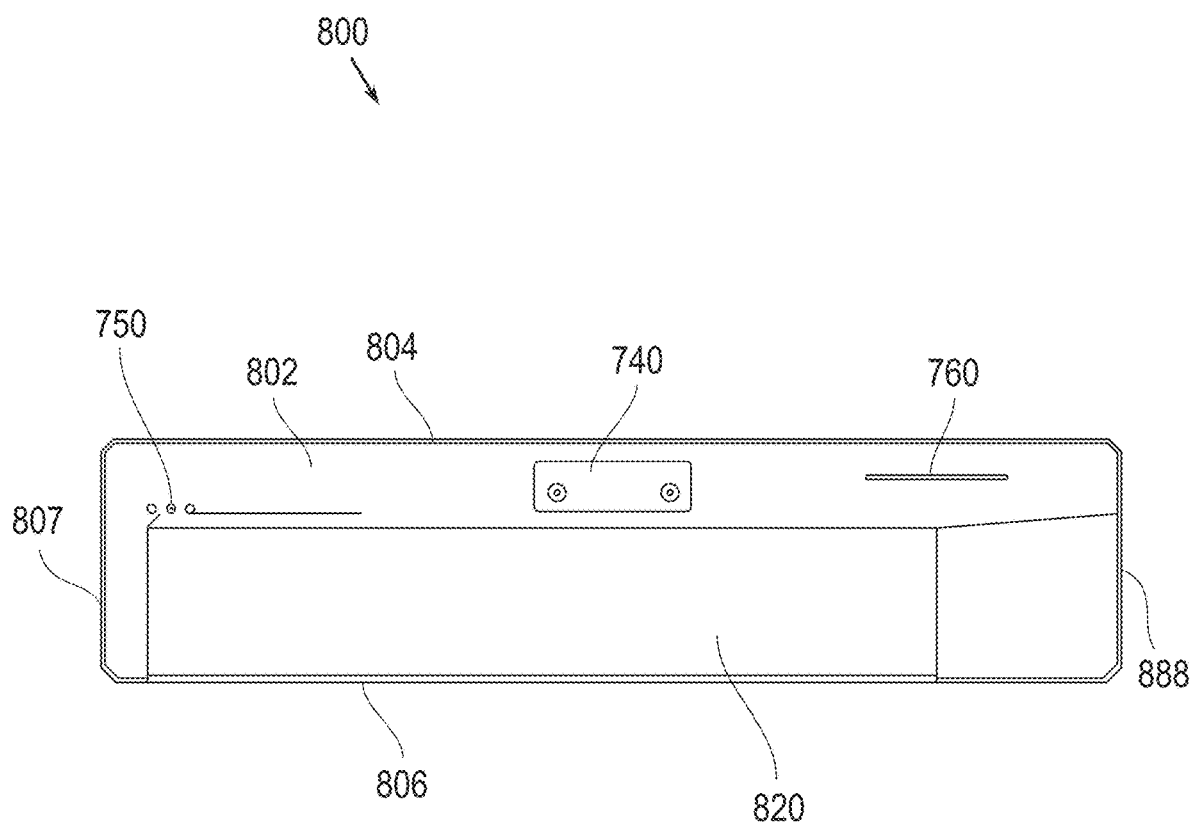
FIG. 12 is a top perspective of an alternative jig.

FIG. 12 illustrates another jig 800 that is similar to the other jigs. The jig 800 is thus formed of a jig body that has a top surface 802, a top edge 804, a bottom edge 806, a left side 807, and a right side 808. Along the top surface 802, a recessed portion 820 is formed. The recessed portion 820 is open along the bottom edge 806 and is configured to receive the printed sheet 200. Thus, unlike the recessed portion in the other jigs, the recessed portion 820 is only enclosed along three edges since it is not enclosed along the bottom edge 806. This type of construction allows for only a portion, such as a top portion or a side portion of the final product to be disposed within the recessed portion 820 and then, as the work progresses, the substrate and printed sheet can be shifted within the recessed portion 820.

Outside the recessed portion 820 there is the fixation member 740 for temporarily locating and holding the printed sheet 200 in place above a substrate which can be a non-metal substrate, such as a polymer-based substrate or any other suitable substrates, that can include the adhesive layer described herein. The fixation member 740 can thus be a clip to hold the printed sheet 200.

In this embodiment, the printed sheet 200 can be formed a non-transparent material, such as a paper stock material or can be formed of a transparent material such as the ones disclosed herein.

The jig 800 has the protrusion (pin) 750 that locates the printed sheet 200 in the manner described herein and also includes the second locating member 760 which can be a linear shaped rib that is located outside the recessed portion 820 and can be located near the top edge 804 of the jig. In other words, the protrusion 750 and the second locating member 760 can be located within a perimeter border area that surrounds the recessed portion 820. The second locating member 760 thus is formed at a position at which the printed sheet 200 will contact and seat against when properly positioned on the jig 800.

Figure 13:
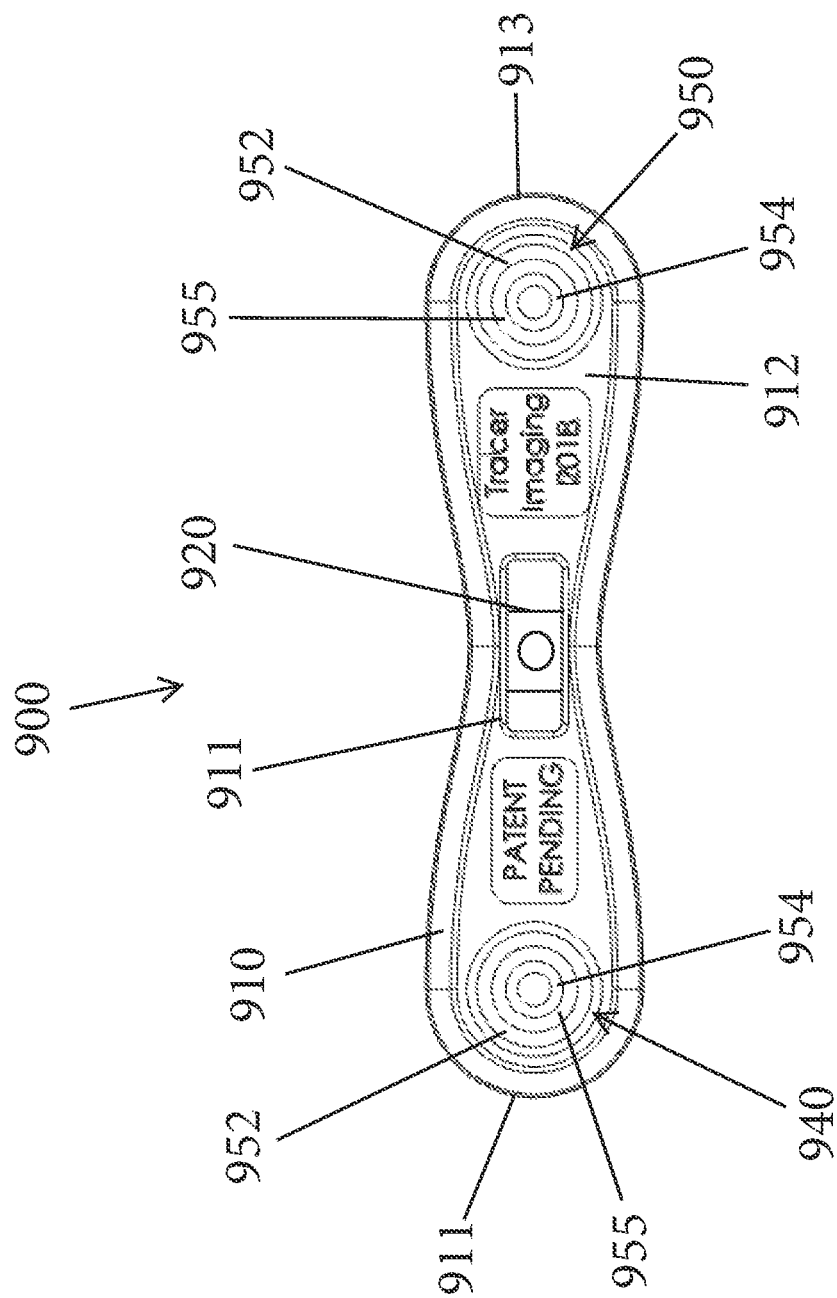
FIG. 13 is a front elevation view of a mount according to one embodiment.
Figure 14:
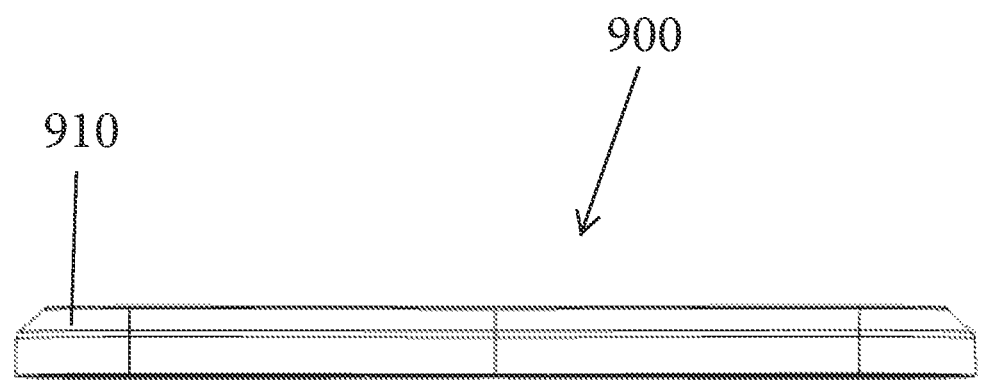
FIG. 14 is a top plan view thereof.
Figure 15:
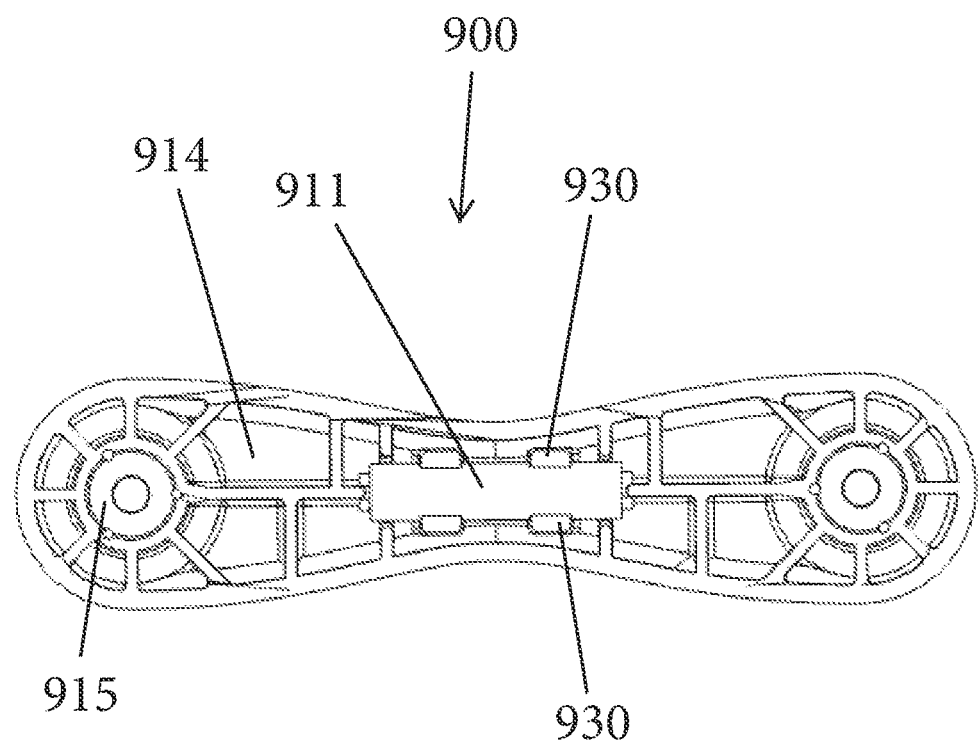
FIG. 15 is a rear elevation view thereof.

FIGS. 13-15 depict a mount 900 that is intended to display a mountable product (e.g., a final printed product) that includes the metal substrate 300 or similar structure as the rear component. The mount 900 can thus be considered to be a wall mount that can be secured to a support surface, such as a wall. The mount 900 is intended to permit the mountable product to be easily hung in a variety of different locations.

The mount 900 is formed of a mount body 910 that has a front face 912 that faces outward from the support surface and an opposing rear face 914 that faces the support surface. The mount body 910 further has a first end 911 and an opposing second end 913. The mount body 910 has an elongated shape and can have an hourglass shape as shown in that the center portion of the mount body 910 can have a waist that has a smaller width than the widths are the ends 911, 913.

The center portion of the mount body 910 can have a window 911 formed therein. The mount 900 also includes a level 920, such as a bubble level, that is held within the mount body 910 in registration with the window 911. The mount 900 can be used to make sure that the mount 900 is properly oriented and level when mounted to the support surface (e.g., a wall). The level 920 is viewable from the front face 912 to permit the user to adjust the mount 900 during the mounting process. FIG. 15 shows the level 920 removed.

It will be appreciated that the level 920 can be permanently attached to the mount body 910 or it can be detachably coupled to the level body 910. In the illustrated embodiment, the level 920 is inserted along the rear face 914 and held in place by two pairs of clips 930. The two pairs of clips 930 are formed of flexible fingers that, under user force, flex open to receive the level 920 and then flex back to capture and hold the level 920 in place. The level 920 is thus cradled in place and held with a friction fit. To remove the level 920, the user simply pulls the clips 930 outward to release the level 920.

It will be appreciated that the mount body 910 can be constructed such that the level 920 is inserted and removed from the front face 912. In other words, the clips 930 can be formed along the front face 912 about the window 911 to allow the insertion and holding of the level 920 in the manner described herein (e.g., friction fit). As described below, the construction allows for removal of the level 920 after the mount 900 is secured to the support surface (wall) in a level manner.

The mount body 910 has a first mounting member 940 and a second mounting member 950 that is spaced from the first mounting member 940. In the illustrated embodiment, each of the first mounting member 940 and the second mounting member 950 can be in the form of at least one magnet. More particularly, the first mounting member 940 is received within a first recessed area formed in the mount body 910 along its front face 912 and the second mounting member 950 is received within a second recessed area formed in the mount body 910 along its front face 912. The first and second recessed areas can be concave shaped recessed or circular or cylindrical shapes recesses that each has a floor structure 915 as shown in FIG. 15. The floor structure 915 has a flat (planar) disk shape with a center hole formed therein.

Each of the first mounting member 940 and the second mounting member 950 can be in the form of one or more cup magnets and in particular, each of the first mounting member 940 and the second mounting member 950 can include a pair of cup magnets, namely, a first cup magnet 952 and a second cup magnet 954 located inside the first cup magnet 952. As is known, a cup magnet is a magnet that is inset into a steel cup that assist in mounting and increase their holding force. The cup magnets can be neodymium cup magnets.

In other words, the first cup magnet 952 has a greater diameter than the second cup magnet 954 and radially surrounds the second cup magnet 954. Between the first cup magnet 952 and the second cup magnet 954, a spacer 955 (e.g., a plastic annular shaped spacer) is provided to space the first cup magnet 952 and the second cup magnet 954. By having spaced apart first cup magnet 952 and the second cup magnet 954, there are two annular shaped magnetic contact surfaces to which the metal base substrate 300 can be attached as described herein. Thus, along the front face, each of the first mounting member 940 and the second mounting member 950 has two magnetic contact surfaces as a result of having two distinct magnets.

The magnets and spacer are thus concentric with respect to one another. Since the magnets have cup shapes, there is a center hole that passes through each of the magnets and also the spacer has a center hole. A fastener, such as a countersunk screw, passes through this aligned center hole to attach the mount body to the support surface (wall).

The magnets and spacer can be secured within each of first and second recessed areas using conventional techniques such as adhesives, bonding agents, mechanical means, etc.

Once the mount 900 is placed against the support surface (wall) and the level 920 is used to level the mount 900, the mount 900 is securely attached to the support surface by passing two fasteners through the center holes that pass through the first mounting member 940 and the second mounting member 950 and the fasteners are anchored into the support surface (wall).

In the embodiment in which the level 920 can be removed from the front face 912 as when the clips that hold the level 920 in place are accessible along the front face, the level 920 can be removed from the front face once the mount 900 is securely attached to the support surface. The level 920 can then be used to level the final print product that is attached to the mount 900. For example, the mountable product can be one of the ones described herein that has a metal backing (e.g., metal base substrate 300) or similar structure that is attracted to the magnets and held in place against the mount 900 by magnetic attraction. In other words, to attach the mountable product to the mount 900, the metal backing (substrate 300) is positioned against the front face of the mount body 910 and held in place by magnetic force; however, the mountable product can be repositioned by lifting it away from the magnets and then repositioning it and placing it back into contact with the magnets. As mentioned, in the embodiment in which the level 920 can be removed, the level 920 can then be placed along the top edge of the mountable product to allow the product to be leveled and optimally positioned against the mount 900. The removable level 920 can have a casing or housing that has at least one planar portion to allow it to sit flush against the top edge of the mountable product.

The level 920 can then be stored separately or discarded after the mountable product is mounted.

It will be appreciated that the mountable product can take any number of different forms and is not limited to being a printed product but instead, any product with a metal backing or other backing that can be held in place by magnets can be used. For example, a metal substrate with an engraving or etching formed on its front surface can be used with the mount 900.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A jig for affixing a sheet to a substrate to form a final product comprising:
   a base having a top edge, a first side and a second side, the base having a recessed portion formed along a front face thereof for receiving the substrate;
   a retaining member configured to hold the sheet, the retaining member being located outside the recessed portion;
   a first guide member formed outside the recessed portion and configured to locate and hold a first portion of the sheet;
   a second guide member formed outside the recessed portion and configured to locate a second portion of the sheet such that in combination with the first guide member the sheet can be placed in a target registration relative to the substrate.

2. The jig of claim 1, wherein the first guide member comprises a pin for reception in a hole formed in the sheet to restrict lateral movement of the sheet but permit rotation of the sheet and the second guide member comprises a rib for placement against one edge of the sheet.

3. The jig of claim 2, wherein the first guide member and the second guide member are formed along the first side of the base.

4. The jig of claim 2, wherein the first guide member and the second guide member are formed along the top edge.

5. The jig of claim 1, wherein the retaining member comprises a clip for holding a top edge of the sheet.

6. The jig of claim 1, further including at least one notch formed along one of the first side and second side of the base, an inner end of the notch being in communication with the recessed portion to permit removal of the substrate.

7. The jig of claim 1, wherein the sheet comprises a transparent sheet with a printed image formed along a rear face thereof and the substrate comprises an adhesive coated metal substrate to which the sheet is affixed.

8. The jig of claim 7, wherein the adhesive coated metal substrate comprises a prelaminated structure including a base metal substrate along with an adhesive component formed along a top surface of the base metal substrate.

9. The jig of claim 8, wherein the adhesive component comprises a carrier having a first face and an opposing second face; a first adhesive layer formed along the second face and in contact with the top surface of the base metal substrate; a second adhesive layer formed along the first face of the carrier for bonding the printed sheet to the adhesive coated metal substrate.

10. The jig of claim 9, wherein the first adhesive layer comprises a pressure sensitive permanent acrylic adhesive and the second adhesive layer comprises a pressure sensitive removable acrylic adhesive.

11. A jig for affixing a sheet to a substrate to form a final product comprising:
   a base having a top edge, a first side and a second side, the base having a recessed portion formed along a front face thereof for receiving the substrate;
   a retaining member configured to hold the sheet, the retaining member being located outside the recessed portion;
   a first guide member formed outside the recessed portion and configured to locate and hold a first portion of the sheet;
   a second guide member formed outside the recessed portion and configured to locate a second portion of the sheet such that in combination with the first guide member the sheet can be placed in a target registration relative to the substrate; and
   a squeegee detachably coupled to the base at a location outside of the recessed portion and between one end of the base and the retaining member.

12. The jig for claim 11, wherein the squeegee has a rear edge that has a recessed center section that accommodates the retaining member when the squeegee is coupled to the base.

13. The jig of claim 11, wherein the first guide member comprises a pin for reception in a hole formed in the sheet to restrict lateral movement of the sheet but permit rotation of the sheet and the second guide member comprises a rib for placement against one edge of the sheet and the retaining member comprises a clip for holding a top edge of the sheet.

14. The jig of claim 11, wherein the base includes a border around the recessed portion, the base further including at least one pair of notches formed along the first side and second side of the base, an inner end of each notch being in communication with the recessed portion to permit removal of the substrate.

15. The jig of claim 11, further including a plurality of through openings formed in the recessed portion.

16. The jig of claim 11, wherein the base includes a pair of protrusions that engage and hold the squeegee.

17. The jig of claim 11, wherein the retaining member is disposed between the first guide member and the second guide member.

* * * * *